United States Patent
Yoon et al.

(10) Patent No.: US 7,479,352 B2
(45) Date of Patent: Jan. 20, 2009

(54) CATHODE ACTIVE MATERIAL FOR LITHIUM BATTERY, CATHODE INCLUDING THE CATHODE ACTIVE MATERIAL, AND LITHIUM BATTERY EMPLOYING THE CATHODE ACTIVE MATERIAL

(75) Inventors: Jae-gu Yoon, Yongin-si (KR); Kyu-sung Park, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/836,666

(22) Filed: Aug. 9, 2007

(65) Prior Publication Data

US 2008/0145760 A1 Jun. 19, 2008

(30) Foreign Application Priority Data

Dec. 13, 2006 (KR) .................. 10-2006-0127191

(51) Int. Cl.
*H01M 4/00* (2006.01)
*H01M 4/50* (2006.01)
*H01M 4/58* (2006.01)

(52) U.S. Cl. .................... 429/223; 429/224; 429/231.1; 429/231.2

(58) Field of Classification Search .................. 429/224, 429/223, 231.1, 231.2
See application file for complete search history.

(56) References Cited

U.S. PATENT DOCUMENTS

2004/0081888 A1 4/2004 Thakeray et al.

OTHER PUBLICATIONS

European Search report dated Jan. 25, 2008, for European application 07113587.5, indicating relevance of listed references in this IDS.
Johnson, C., et al., *Structural and electrochemical evaluation of $(1-x)Li_2TiO_3$ $(x)LiMn_{0.5}Ni_{0.5}O_2$ electrodes for lithium batteries*, Journal of Power Sources, vol. 119-121, (2003), pp. 139-144, XP004430155).
Jin, S., et al., *The effect of compositional change of transition metals on the electrochemical behavior of layered $LiMO_2$ ($M=Li_wNi_xCo_yMn_z$)*, Journal of Power Sources, vol. 158, (2006), pp. 620-626, XP005506445.
Wu, Y, et al., *High Capacity, Surface-Modified Layered $Li[Li_{(1-x)/3}Mn_{(2-x)/3}Co_{x/3}]O_2$ Cathodes with Low Irreversible Capacity Loss*, Electrochemical and Solid State Letters, vol. 9, No. 5, (2006), pp. A221-A224, XP002460582.

*Primary Examiner*—Dah-Wei Yuan
*Assistant Examiner*—Bryant Suitte
(74) *Attorney, Agent, or Firm*—Christie, Parker & Hale, LLP

(57) ABSTRACT

Cathode active materials for lithium batteries are provided. In one embodiment, the cathode active material is a lithium complex material represented by the following Formula: $yLi[Li_{1/3}Me_{2/3}]O_2\text{-}(1\text{-}y)LiMe'O_2$. In the formula, $0<y\leq0.8$, Me is a metal group having an oxidation number of +4 and includes a transition metal selected from Mo, W, V, Ti, Zr, Ru, Rh, Pd, Os, Ir, Pt and combinations thereof, and Me' includes a transition metal selected from Ni, Mn, Co and combinations thereof. Lithium batteries employing the cathode active materials are also provided and exhibit improved energy density and high-rate capabilities of an electrode.

19 Claims, 6 Drawing Sheets

CATHODE ACTIVE MATERIAL FOR LITHIUM BATTERY, CATHODE INCLUDING THE CATHODE ACTIVE MATERIAL, AND LITHIUM BATTERY EMPLOYING THE CATHODE ACTIVE MATERIAL

CROSS-REFERENCE TO RELATED PATENT APPLICATION

This application claims priority to and the benefit of Korean Patent Application No. 10-2006-0127191, filed on Dec. 13, 2006 in the Korean Intellectual Property Office, the entire content of which is incorporated herein by reference.

BACKGROUND OF THE INVENTION

1. Field of the Invention

The present invention relates to cathode active materials for lithium batteries, cathodes including the cathode active materials, and lithium batteries employing the cathode active materials.

2. Description of the Related Art

Lithium batteries are high capacity batteries, and thus, are widely used in portable information and communication equipment, which require lightness and long lifetime. Thus, the lithium battery industry has rapidly grown. The characteristics of lithium batteries are significantly affected by the electrochemical properties of the cathode active materials as well as by the anodes, the electrolyte solutions, the separators, etc.

Among current commercially available cathode active materials, $LiCoO_2$ is the most widely used and has a capacity per weight of up to 140~150 mAh/g due to its intrinsic characteristics. Prospective materials expected to be used as next generation high-voltage-based cathode materials have a capacity per weight of up to 180 mAh/g, and, when converted to capacity per unit volume, merely 600 mAh/cc.

SUMMARY OF THE INVENTION

In one embodiment, the present invention provides a cathode active material for a lithium battery, imparting improved energy density and high-rate capabilities to the electrode.

In another embodiment, the present invention provides a cathode including the cathode active material.

In yet another embodiment, the present invention provides a lithium battery employing the cathode active material, and the battery has high volumetric energy density and improved high-rate capabilities.

According to an embodiment of the present invention, a cathode active material for a lithium battery includes a lithium complex material represented by Formula 1 below:

$$yLi[Li_{1/3}Me_{2/3}]O_2\text{-}(1\text{-}y)LiMe'O_2 \qquad \text{Formula 1}$$

In Formula 1, $0<y\leq 0.8$, Me is a metal group having an oxidation number of +4 and includes a transition metal selected from Mo, W, V, Ti, Zr, Ru, Rh, Pd, Os, Ir, Pt and combinations thereof, and Me' includes a transition metal selected from Ni, Mn, Co and combinations thereof.

According to an embodiment of the present invention, in Formula 1, Me may be a metal group represented by Formula 2 below:

$$M'_aM_bMn_c \qquad \text{Formula 2}$$

In Formula 2, M is a transition metal selected from Mo, W, V, Ti, Zr, Ru, Rh, Pd, Os, Ir, Pt and combinations thereof, M' is a metal selected from Ni, Cu, Zn, Co, Cr, Fe, Mg and combinations thereof, $0\leq a\leq 0.33$, $0<b\leq 0.33$ and $a+b+c=1$.

According to another embodiment of the present invention, in Formula 2, M may be Mo, W, or V.

According to another embodiment of the present invention, in Formula 2, M may be Mo, and M' may be Ni.

According to another embodiment of the present invention, in Formula 1, when Mo is incorporated into Me, the content of Mo may be from about 0.3 to about 10 mole % based on the total number of moles of metals contained in Me and Me'.

According to another embodiment of the present invention, in Formula 1, Me' may be $Ni_aMo_bMn_c$.

According to another embodiment of the present invention, in Formula 1, Me' may be a metal group represented by Formula 3 below:

$$Ni_{a'}Co_{b'}Mn_{c'} \qquad \text{Formula 3}$$

In Formula 3, $0\leq a'\leq 0.5$, $0\leq b'\leq 0.5$ and $a'+b'+c'=1$.

According to another embodiment of the present invention, in Formula 1, $0.4\leq y<0.7$.

According to another embodiment of the present invention, there is provided a cathode including the above-described cathode active material.

According to another embodiment of the present invention, there is provided a lithium battery including a cathode, an anode, and an organic electrolyte solution, wherein the cathode includes the above-described cathode active material.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Figure 1:
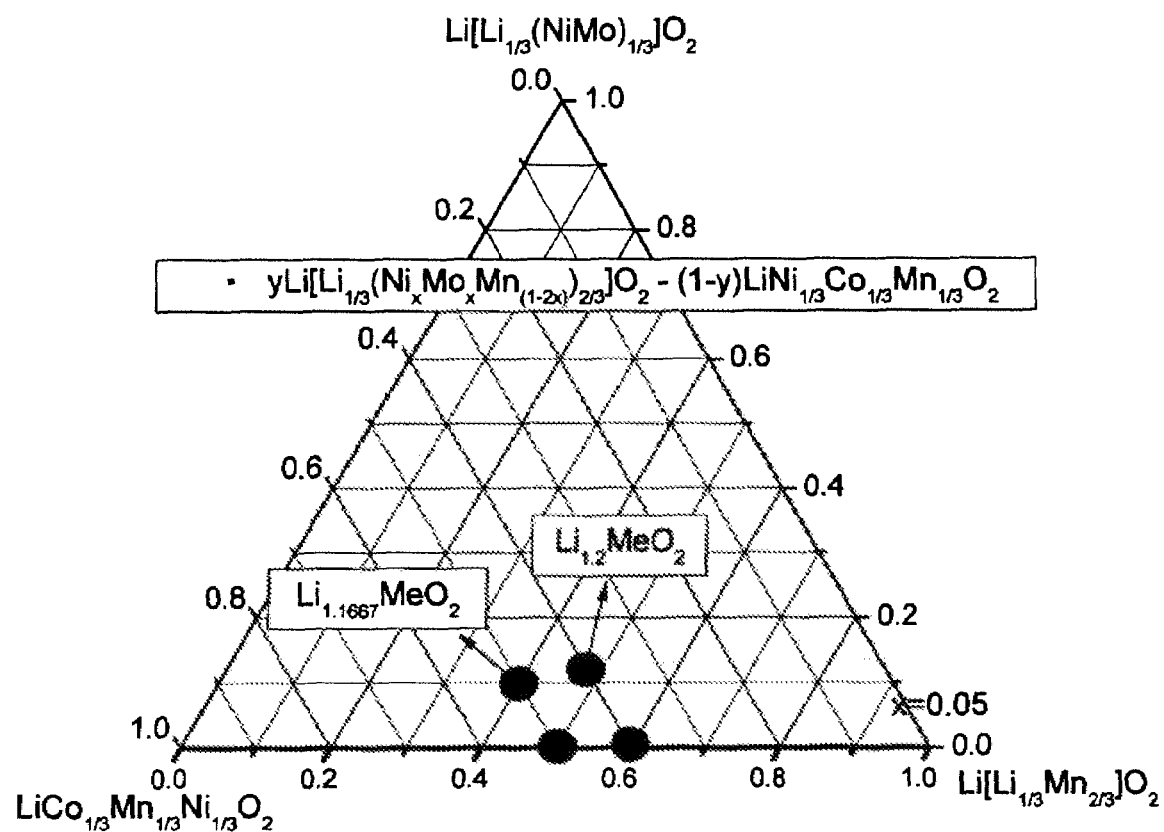
FIG. 1 is a phase diagram illustrating a cathode active material according to one embodiment of the present invention.

The present invention will now be described more fully with reference to the accompanying drawings, in which exemplary embodiments of the invention are shown.

A cathode active material according to one embodiment of the present invention includes a lithium complex material represented by $yLi[Li_{1/3}Me_{2/3}]O_2\text{-}(1\text{-}y)LiMe'O_2$ where Me includes a transition metal having a +4 oxidation number selected from Mo, W, V, Ti, Zr, Ru, Rh, Pd, Os, Ir, Pt and combinations thereof. The lithium complex material is useful as a cathode active material for a lithium battery and imparts improved physical and electrochemical properties. Moreover, a lithium battery employing the cathode active material can maintain a stable electrode structure even during consecutive charge/discharge cycles, thereby retarding the degradation of the electrode.

In one embodiment, the cathode active material is a complex material having a $Li_2MeO_3$ component incorporated into a layered $LiMe'O_2$ structure, and may be represented by $yLi_2MeO_3$-$(1-y)LiMe'O_2$. In the $LiMe'O_2$ component of the complex material, Li and oxygen have +1 and −2 oxidation numbers, respectively, and thus, the oxidation number of Me' must be +3. For example, in $Li[Mn_{0.5}Ni_{0.5}]O_2$, the metal group represented by $[Mn_{0.5}Ni_{0.5}]$ must have an oxidation number of +3. Thus, when the oxidation number of Mn is +4, the oxidation number of Ni is +2.

The $Li_2MeO_3$ component also has a layered structure wherein a lithium ion layer and a layer containing a 2:1 ratio of Me and a lithium ion are alternately stacked in a cubic close-packing oxygen array. Thus, the $Li_2MeO_3$ component may be represented by $Li[Li_{1/3}Me_{2/3}]O_2$. The numbers in the brackets refer to a molar ratio of each metal ion contained in a single layer. The metal group represented by Me has an oxidation number of +4.

In one embodiment of the present invention, the Me in the $Li_2MeO_3$ component includes at least one transition metal that can have various oxidation numbers (i.e., at least one of Mo, W, V, Ti, Zr, Ru, Rh, Pd, Os, Ir, and Pt). The incorporation of a transition metal that can have various oxidation numbers into Me enables increased electrode density and enhanced electroconductivity.

In summary, a cathode active material for a lithium battery according to one embodiment of the present invention includes a complex material represented by Formula 1 below:

$yLi[Li_{1/3}Me_{2/3}]O_2$-$(1-y)LiMe'O_2$     Formula 1

In Formula 1, $0<y\leq0.8$, Me is a metal group having an oxidation number of +4, and includes a transition metal selected from Mo, W, V, Ti, Zr, Ru, Rh, Pd, Os, Ir, Pt and combinations thereof, and Me' includes a transition metal selected from Ni, Mn, Co and combinations thereof.

In Formula 1, Me (which is the metal group having the oxidation number of +4) may include at least one transition metal (also referred to as simply M, hereinafter) selected from Mo, W, V, Ti, Zr, Ru, Rh, Pd, Os, Ir, and Pt that can have various oxidation numbers, thus increasing the volumetric energy density of the electrode. With a view to manufacturing convenience, Mo, W, V and combinations thereof may be used. In one embodiment, Mo is used as it has an ionic diameter that is more compatible with other metals.

The molar ratio of M in Me may be greater than about zero (0) and less than about 0.33, assuming that the total number of moles of metals contained in Me is 1. If the molar ratio of M exceeds about 0.33, the charge/discharge capacity of the electrode may be reduced.

In order to enhance the electroconductivity of the electrode, Me may further include Mn in addition to the at least one transition metal selected from Mo, W, V, Ti, Zr, Ru, Rh, Pd, Os, Ir, and Pt.

Me may further include at least one metal selected from Ni, Cu, Zn, Co, Cr, Fe, and Mg (also referred to simply as M', hereinafter) that, when it exists in a +2 oxidation state, can bind with oxygen in order to adjust the oxidation number of Me to +4. In one embodiment, Ni is used as it is capable of providing a more stable structure.

When Me includes M', the molar ratio of M' may range from about 0 to about 0.33, assuming that the total number of moles of metals contained in Me is 1. If the molar ratio of M' exceeds about 0.33, charge/discharge capacity may be reduced.

In this regard, according to one embodiment of the present invention, Me in the complex material of Formula 1 may be represented by Formula 2 below:

$M'_aM_bMn_c$     Formula 2

In Formula 2, M and M' are as defined above, $0\leq a\leq0.33$, $0<b\leq0.33$, and $a+b+c=1$.

According to an embodiment of the present invention, in the cathode active material for the lithium battery, when Me includes Mo, the content of Mo may range from about 0.3 to about 10 mole % based on the total number of moles of metals contained in Me and Me'. If the content of Mo is less than about 0.3 mole %, the effect of the addition of Mo may be insignificant, and thus, increases in capacity per unit volume of the electrode may not be achieved. On the other hand, if the content of Mo exceeds about 10 mole %, the capacity per unit volume of the electrode may be reduced.

Me' of the $LiMe'O_2$ component constitutes a basic layered structure of the cathode active material according to one embodiment of the present invention and may include at least one transition metal selected from Ni, Mn, and Co. In another embodiment, in order to provide a stable electrode structure, Me' may be a metal group represented by Formula 3 below:

$Ni_{a'}Co_{b'}Mn_{c'}$     Formula 3

In Formula 3, $0\leq a'\leq0.5$, $0\leq b'\leq0.33$ and $a+b+c=1$.

According to an embodiment of the present invention, in Formula 1, y serves as a factor determining the molar ratio of the $Li[Li_{1/3}Me_{2/3}]O_2$ and $LiMeO_2$ components. In one embodiment, $0<y\leq0.8$. In another embodiment, $0.4\leq y<0.7$. If y exceeds about 0.8, the ratio of the $Li[Li_{1/3}Me_{2/3}]O_2$ component relative to the $LiMeO_2$ component increases, thereby decreasing charge/discharge capacity and electroconductivity.

FIG. 1 is a phase diagram illustrating a cathode active material according to an embodiment of the present invention. Referring to FIG. 1, a cathode active material according to an embodiment of the present invention may include a complex material having coordinates of the $LiCo_{1/3}Mn_{1/3}Ni_{1/3}O_2$, $Li[Li_{1/3}Mn_{2/3}]O_2$, and $Li[Li_{1/3}(NiMo)_{1/3}]O_2$ components. The oxidation numbers of the metal groups in the three components are +3, +4, and +4, respectively. In this case, a cathode active material according to an embodiment of the present invention may be a complex material represented as $yLi[Li_{1/3}(Ni_aMo_bMn_{(1-a-b)})_{2/3}]O_2$-$(1-y)LiNi_{1/3}Co_{1/3}Mn_{1/3}O_2$, i.e. the combination of the three components. In FIG. 1, full circles represent the coordinates of complex materials having a specific molar ratio of the three components, i.e., $LiCo_{1/3}Mn_{1/3}Ni_{1/3}O_2$, $Li[Li_{1/3}Mn_{2/3}]O_2$, and $Li[Li_{1/3}(NiMo)_{1/3}]O_2$.

Figure 2:
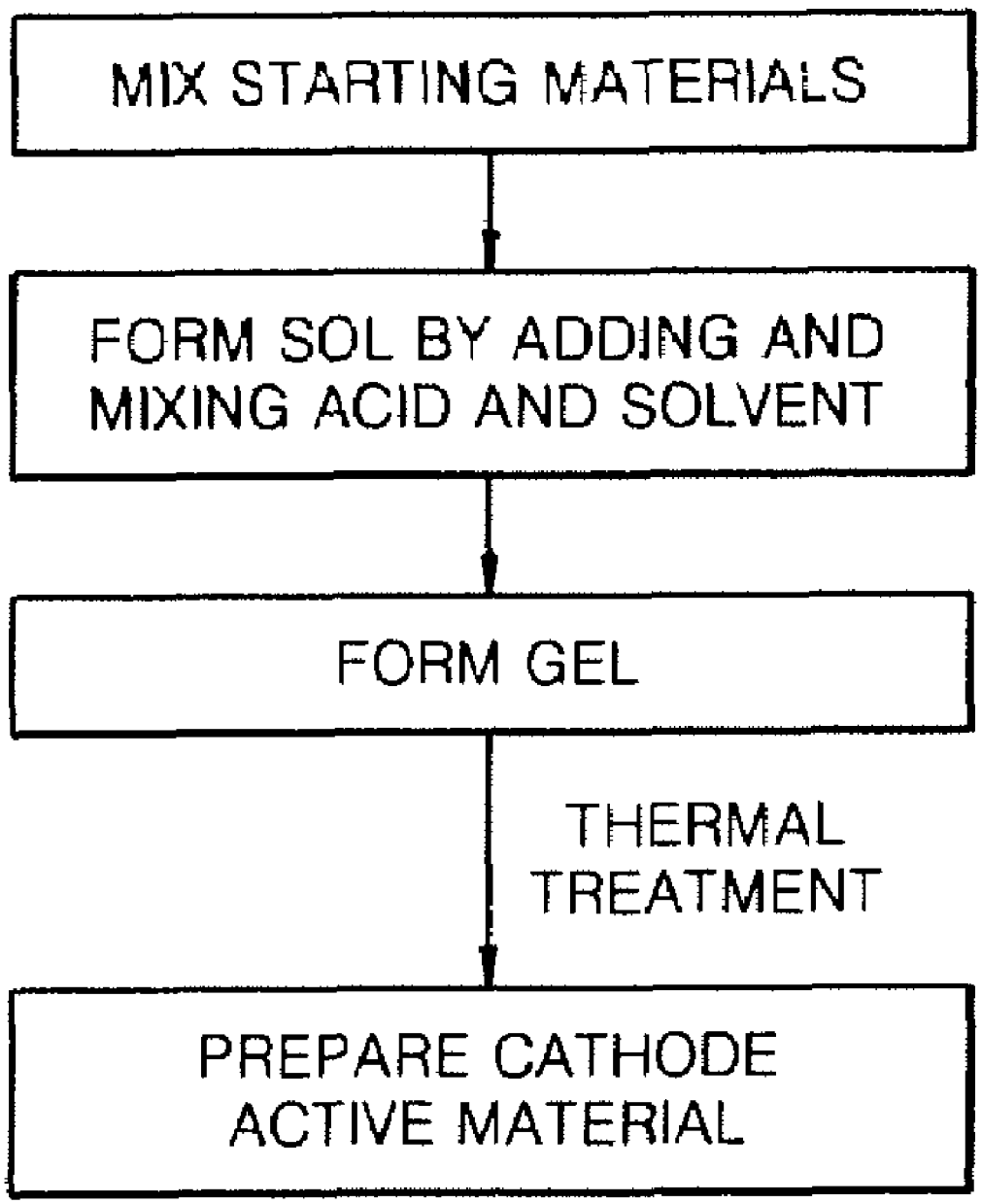
FIG. 2 is a flowchart illustrating a method of preparing a cathode active material according to one embodiment of the present invention.

FIG. 2 is a flowchart illustrating a method of preparing a cathode active material according to an embodiment of the present invention.

A cathode active material according to an embodiment of the present invention may be prepared as a powder using, for example, a combustion synthesis method. First, starting materials containing desired metals, e.g., carbonate (e.g., manganese carbonate), acetate (e.g., manganese acetate, cobalt acetate), and ammonium salt (e.g., ammonium molybdate), are mixed in a specified stoichiometric ratio. An acid (e.g., citric acid) and a solvent (e.g., ethyleneglycol) are added to the reaction mixture to form a sol. Moisture is evaporated from the sol-phase mixture to form a gel. The resultant gel is ignited in a hot plate and further thermally treated to obtain a cathode active material represented as a lithium complex material of Formula 1 in the form of powder.

Alternatively, a cathode active material according to an embodiment of the present invention may be prepared using a hydrothermal process under basic conditions using LiOH and/or KOH. The hydrothermal process may be performed under pressurized conditions, e.g., in a pressurized autoclave set to an atmospheric pressure of about 5 to about 35 atm, and a temperature of about 100 to about 150° C. for about 6 to about 12 hours.

A cathode active material according to an embodiment of the present invention may also be prepared using a solid-phase process. Starting materials such as metal carbonates or metal oxides are uniformly mixed in a solid phase and then thermally treated to obtain a cathode active material.

The preparation of the cathode active material according to the present invention is not limited to the above-described methods. It is understood that the cathode active materials according to the present invention can be prepared using any suitable method.

The shape of a lithium battery employing a cathode active material according to an embodiment of the present invention is not particularly limited, but may be cylindrical, square, coin-shaped, button-shaped, laminate seal-shaped, etc. A lithium battery according to one embodiment of the present invention may be a lithium secondary battery. According to another embodiment, the lithium battery may be a lithium primary battery. Methods of manufacturing a cathode and a lithium battery according to an embodiment of the present invention will now be described.

First, a cathode active material according to an embodiment of the present invention, a conducting agent, a binder, and a solvent are mixed to prepare a cathode active material composition. The cathode active material composition is directly coated on an aluminum current collector and roll-pressed to prepare a cathode plate. Alternatively, a cathode plate may also be prepared by casting the cathode active material composition on a separate support, separating the film from the support and laminating the film on an aluminum current collector.

A nonlimiting example of a suitable conducting agent is carbon black, such as ketjen black. Nonlimiting examples of suitable binders include vinylidene fluoride/hexafluoropropylene copolymers, polyvinylidenefluoride (PVDF), polyacrylonitrile, polymethylmethacrylate (PMMA), polytetrafluoroethylene (PTFE), and mixtures thereof. Other nonlimiting examples of suitable binders include styrene butadiene rubber-based polymers. Nonlimiting examples of suitable solvents include N-methylpyrrolidone, acetone, water, and the like. The cathode active material, the conducting agent, the binder, and the solvent are each used in an amount commonly used in lithium batteries.

Like in the above-described preparation of the cathode plate, an anode plate is prepared by first mixing an anode active material, a conducting agent, a binder, and a solvent to prepare an anode active material composition. The anode active material composition may be directly coated on a copper current collector to obtain an anode plate. Alternatively, the anode active material composition may be cast on a separate support, separated from the support and then laminated on a copper current collector to obtain an anode plate. Here, the anode active material, the conducting agent, the binder, and the solvent are each used in an amount commonly used in lithium batteries.

Nonlimiting examples of suitable anode active materials include lithium metal, lithium alloy, carbonaceous materials, and graphite. The conducting agent, the binder, and the solvent in the anode active material composition may be the same as those in the cathode active material composition. In some cases, the cathode active material composition and the anode active material composition may further include a plasticizer to form pores inside the electrode plates.

The cathode plate and the anode plate may be separated by a separator. The separator is not limited and may be any separator commonly used in lithium batteries. In particular, a separator having low resistance against ion mobility of the electrolyte and good electrolyte impregnation properties may be used. For example, the separator may be formed of a material selected from glass fiber, polyester, Teflon, polyethylene, polypropylene, polytetrafluoroethylene (PTFE), and combinations thereof. The separator may also be formed of woven or non-woven materials. In more detail, a coilable separator formed of a material such as polyethylene or polypropylene may be used in lithium ion batteries, and a separator having good electrolyte impregnation properties may be used in lithium ion polymer batteries. These separators can be manufactured as follows.

A polymer resin, a filler, and a solvent are mixed to prepare a separator composition. The separator composition is directly coated on an electrode and dried to form a separator film. Alternatively, the separator composition can be cast on a support and dried to form a separator film, which is then removed from the support and laminated on an electrode.

The polymer resin is not particularly limited, and may be selected from any binder materials used in electrode plates. For example, nonlimiting examples of suitable polymer resins include vinylidenefluoride/hexafluoropropylene copolymers, polyvinylidenefluoride, polyacrylonitrile, polymethylmethacrylate, and mixtures thereof.

Figure 6:
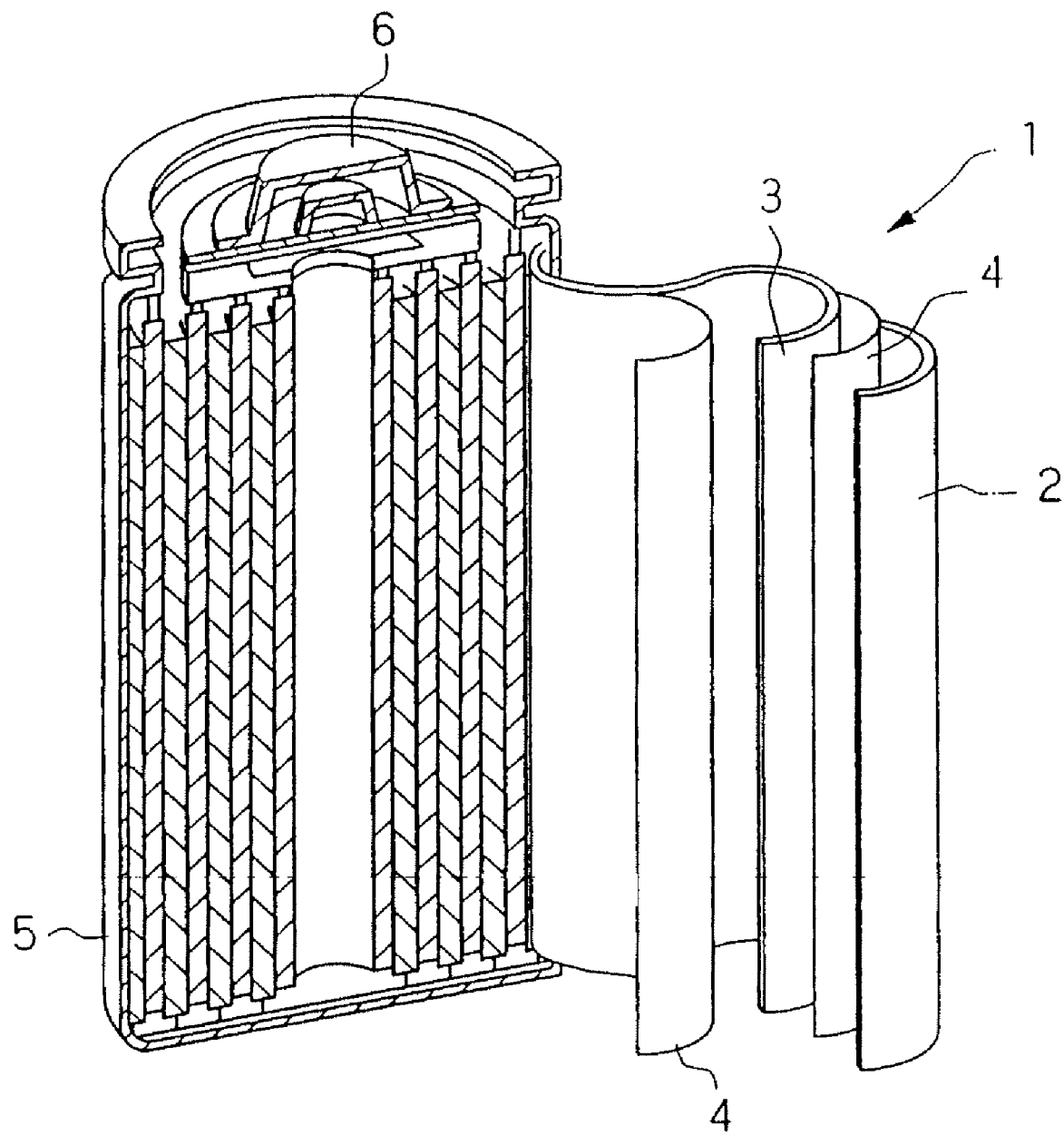
FIG. 6 is a schematic cross-sectional view of a lithium battery according to one embodiment of the present invention.

As shown in FIG. 6, in a lithium battery 1, the separator 4 is disposed between the cathode plate 2 and anode plate 3 to form a battery structure. The battery structure is wound or folded and encased in a cylindrical or square battery case 5, and sealed with a cap assembly 6. An organic electrolyte solution is then injected into the case to complete a lithium ion battery.

Alternatively, battery structures may stacked to form a bicell structure and impregnated with an organic electrolyte solution. The resultant structure is received in a pouch and sealed to complete a lithium ion polymer battery.

The organic electrolyte solution used in lithium batteries may include a lithium salt and a mixed organic solvent composed of a high dielectric constant solvent and a low boiling point solvent.

The high dielectric constant solvent used herein is not particularly limited and can be any such solvent commonly used in the pertinent art. Nonlimiting examples of suitable high dielectric constant solvents include cyclic carbonates (e.g., ethylene carbonate (EC), propylene carbonate, or butylene carbonate), gamma-butyrolactone, and the like.

The low boiling point solvent used herein may also be selected from solvents commonly used in the pertinent art. Nonlimiting examples of suitable low boiling point solvents include chain carbonates (e.g., diemethyl carbonate, ethylmethyl carbonate, diethyl carbonate (DEC), or dipropyl carbonate), dimethoxyethane, diethoxyethane, fatty acid ester derivatives, and the like.

The lithium salt is also not limited and can be any lithium salt commonly used in lithium batteries. Nonlimiting examples of suitable lithium salts include $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$.

The concentration of the lithium salt in the organic electrolyte solution may range from about 0.5 to about 2 M.

Hereinafter, the present invention will be described more specifically with reference to the following examples. The following examples are presented for illustrative purposes only and are not intended to limit the scope of the invention.

Preparation of Cathode Active Materials

EXAMPLE 1

$0.5Li[Li_{1/3}(Ni_{1/10}Mo_{1/10}Mn_{8/10})_{2/3}]O_2\text{-}0.5LiNi_{1/3}Co_{1/3}Mn_{1/3}O_2$ Starting materials of Lithium carbonate, nickel acetate, cobalt acetate, manganese acetate, and ammonium heptamolybdate were weighed in a stoichiometric ratio sufficient to prepare 0.04 moles of a $0.5Li[Li_{1/3}(Ni_{1/10}Mo_{1/10}Mn_{8/10})_{2/3}]O_2\text{-}0.5LiNi_{1/3}Co_{1/3}Mn_{1/3}O_2$ cathode active material.

The starting materials were then dissolved in 50 Ml of an aqueous dilute nitric acid solution, and 50 Ml of an aqueous citric acid solution and 30 Ml of ethyleneglycol were added thereto. The resultant sol was heated on a hot plate while stirring to evaporate water. The resultant gel was ignited on the hot plate until the gel was completely burnt out, thermally treated at 1,000° C. for five hours in flowing dry air, and cooled in a furnace to obtain a cathode active material in the form of a powder. The content of transition metals in the powder was analyzed using inductively coupled plasma (ICP). X-ray diffraction (XRD) analysis showed that the powder had a layered crystal structure.

EXAMPLE 2

$0.6Li[Li_{1/3}(Ni_{1/10}Mo_{1/10}Mn_{8/10})_{2/3}]O_2\text{-}0.4LiNi_{1/3}Co_{1/3}Mn_{1/3}O_2$ 0.04 moles of a cathode active material was prepared as in Example 1 except that starting materials of lithium carbonate, nickel acetate, cobalt acetate, manganese acetate, and ammonium heptamolybdate were weighed in a stoichiometric ratio sufficient to prepare a $0.6Li[Li_{1/3}(Ni_{1/10}Mo_{1/10}Mn_{8/10})_{2/3}]O_2\text{-}0.4LiNi_{1/2}Co_{1/10}Mn_{2/5}O_2$ cathode active material.

EXAMPLE 3

$0.6Li[Li_{1/3}(Ni_{1/10}Mo_{1/10}Mn_{8/10})_{2/3}]O_2\text{-}0.4LiNi_{1/2}Co_{1/10}Mn_{2/5}O_2$ 0.04 moles of a cathode active material was prepared as in Example 1 except that starting materials of lithium carbonate, nickel acetate, cobalt acetate, manganese acetate, and ammonium heptamolybdate were weighed in a stoichiometric ratio sufficient to prepare a $0.6Li[Li_{1/3}(Ni_{1/10}Mo_{1/10}Mn_{8/10})_{2/3}]O_2\text{-}0.4LiNi_{1/2}Co_{1/10}Mn_{2/5}O_2$ cathode active material.

COMPARATIVE EXAMPLE 1

$0.5Li[Li_{1/3}Mn_{2/3}]O_2\text{-}0.5LiNi_{1/3}Co_{1/3}Mn_{1/3}O_2$ 0.04 moles of a cathode active material was prepared as in Example 1 except that starting materials of lithium carbonate, nickel acetate, cobalt acetate, and manganese acetate were weighed in a stoichiometric ratio sufficient to prepare a $0.5Li[Li_{1/3}Mn_{2/3}]O_2\text{-}0.5LiNi_{1/3}Co_{1/3}Mn_{1/3}O_2$ cathode active material.

COMPARATIVE EXAMPLE 2

$0.6Li[Li_{1/3}Mn_{2/3}]O_2\text{-}0.4LiNi_{1/3}Co_{1/3}Mn_{1/3}O_2$ 0.04 moles of a cathode active material was prepared as in Example 1 except that starting materials of lithium carbonate, nickel acetate, cobalt acetate, and manganese acetate were weighed in a stoichiometric ratio sufficient to prepare a $0.6Li[Li_{1/3}Mn_{2/3}]O_2\text{-}0.4LiNi_{1/3}Co_{1/3}Mn_{1/3}O_2$ cathode active material.

Manufacture and Evaluation of Lithium Batteries

Coin cells were manufactured using the cathode active materials prepared according to Examples 1-3 and Comparative Examples 1-2 as follows. The active materials prepared according to Examples 1-3 and Comparative Examples 1-2 are listed in Table 1.

93 parts by weight of each cathode active material prepared according to Examples 1-3 and Comparative Examples 1-2, and 3 parts by weight of ketjen black (EC-600JD) as a conducting agent were uniformly mixed, and a polyvinylidenefluoride (PVDF) binder solution was added thereto to make slurries having weight ratios of the active material, the conducting agent, and the binder of 93:3:4. Each slurry was coated on aluminum foil having a thickness of 15 μm and dried to manufacture a cathode plate. Each cathode plate was further dried under vacuum. The resultant coin cells (CR2016 type) were subjected to charge/discharge tests. In the manufacture of each coin cell, metal lithium was used as the anode (or counter electrode), and a mixed solvent of ethylenecarbonate (EC) and diethylenecarbonate (DEC) (3:7) including 1.3M $LiPF_6$ was used as the electrolyte solution.

The charge/discharge cycle tests were performed in a voltage range of 2 to 4.6V. The cells were charged with a constant current until the cell voltage reached 4.6V, and then with a constant voltage of 4.6V until the current was reduced to 1/10 of the initial current. The cells were discharged with a constant current until the cell voltage reached 2V. Rate tests were performed by charging to 75 mA/g and discharging under different current conditions to evaluate rate capability.

The capacities per unit electrode volume for the lithium batteries employing the cathode active materials prepared according to Examples 1-3 and Comparative Examples 1-2 are summarized in Table 1 below.

TABLE 1

| | Composition of cathode active material | Discharge capacity of 20 mA/g (mAh/cc) | Discharge capacity of 75 mA/g (1st cycle) | Discharge capacity of 75 mA/g (50th cycle) |
|---|---|---|---|---|
| Example 1 | $0.5Li[Li_{1/3}(Ni_{1/10}Mo_{1/10}Mn_{8/10})_{2/3}]O_2$—$0.5LiNi_{1/3}Co_{1/3}Mn_{1/3}O_2$ | 702 mAh/cc | 642 mAh/cc | 558 mAh/cc |
| Example 2 | $0.6Li[Li_{1/3}(Ni_{1/10}Mo_{1/10}Mn_{8/10})_{2/3}]O_2$—$0.4LiNi_{1/3}Co_{1/3}Mn_{1/3}O_2$ | 781 mAh/cc | 706 mAh/cc | 536 mAh/cc |
| Example 3 | $0.6Li[Li_{1/3}(Ni_{1/10}Mo_{1/10}Mn_{8/10})_{2/3}]O_2$—$0.4LiNi_{1/2}Co_{1/10}Mn_{2/5}O_2$ | 748 mAh/cc | 706 mAh/cc | 512 mAh/cc |
| Comparative Example 1 | $0.5Li[Li_{1/3}Mn_{2/3}]O_2$—$0.5LiNi_{1/3}Co_{1/3}Mn_{1/3}O_2$ | 635 mAh/cc | 570 mAh/cc | 493 mAh/cc |
| Comparative Example 2 | $0.6Li[Li_{1/3}Mn_{2/3}]O_2$—$0.4LiNi_{1/3}Co_{1/3}Mn_{1/3}O_2$ | 693 mAh/cc | 570 mAh/cc | 493 mAh/cc |

Referring to Table 1, when comparing the lithium batteries employing the cathode active materials prepared according to Example 1 and that prepared according to Comparative Example 1 (which had a similar composition except without Mo), the lithium batteries employing the cathode active material of Example 1 showed a higher discharge capacity per unit electrode volume than the lithium batteries employing the cathode active material of Comparative Example 1. Moreover, when comparing the lithium batteries employing the cathode active materials prepared according to Example 2 and that prepared according to Comparative Example 2, the same results as described above with respect the Example 1 and Comparative Example 1 were obtained.

Figure 3:
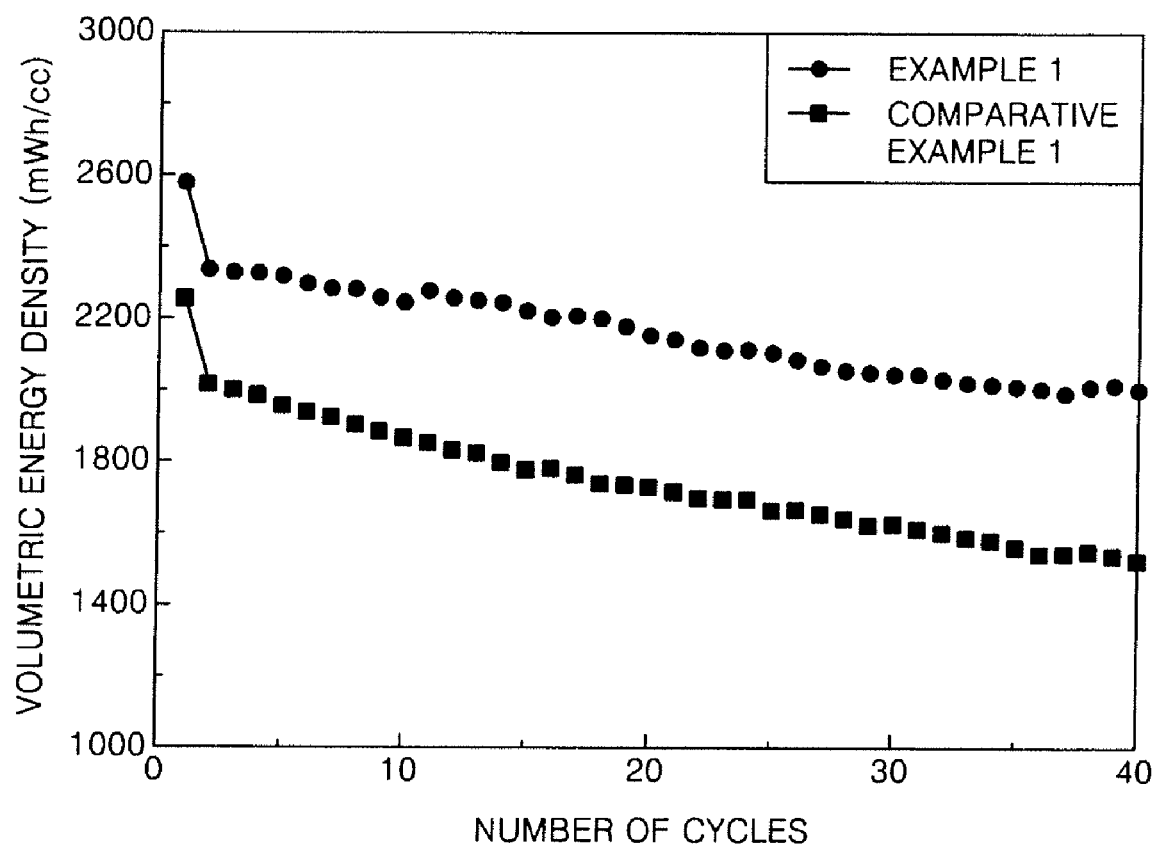
FIG. 3 is a graph comparing the volumetric electrode energy density with respect to the number of cycles of the lithium batteries employing cathode active materials prepared according Example 1 and Comparative Example 1.
Figure 4:
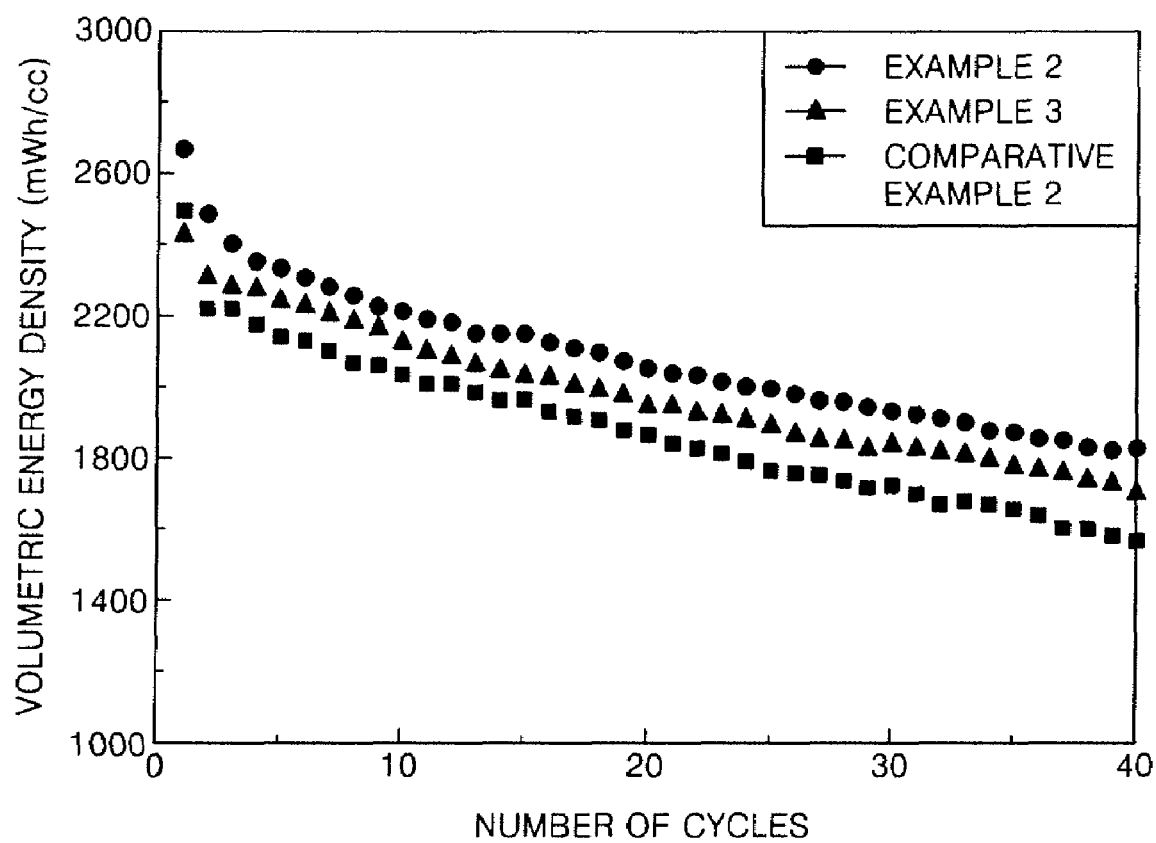
FIG. 4 is a graph comparing the volumetric electrode energy density with respect to the number of cycles of the lithium batteries employing cathode active materials prepared according to Examples 2 and 3 and Comparative Example 2.

FIG. 3 is a graph comparing the volumetric electrode energy density with respect to the number of cycles of the lithium batteries employing the cathode active materials prepared according to Example 1 and Comparative Example 1. FIG. 4 is a graph comparing the volumetric electrode energy density with respect to the number of cycles of the lithium batteries employing the cathode active materials prepared according to Examples 2-3 and Comparative Example 2.

Referring to the graphs of FIGS. 3 and 4, the lithium batteries employing the cathode active materials prepared according to Examples 1-3 according to embodiments of the present invention showed better electroconductivity as well as higher capacity per unit volume than the lithium batteries employing the cathode active materials prepared according to Comparative Examples 1 and 2. Thus, the lithium batteries employing the cathode active materials prepared according to Examples 1-3 have enhanced volumetric energy density. Moreover, FIGS. 3 and 4 show that the initial energy densities of the lithium batteries employing the cathode active materials prepared according to Examples 1-3 are maintained for a certain number of cycles. This result shows that a lithium battery employing a cathode active material according to an embodiment of the present invention has improved lifetime characteristics.

Figure 5:
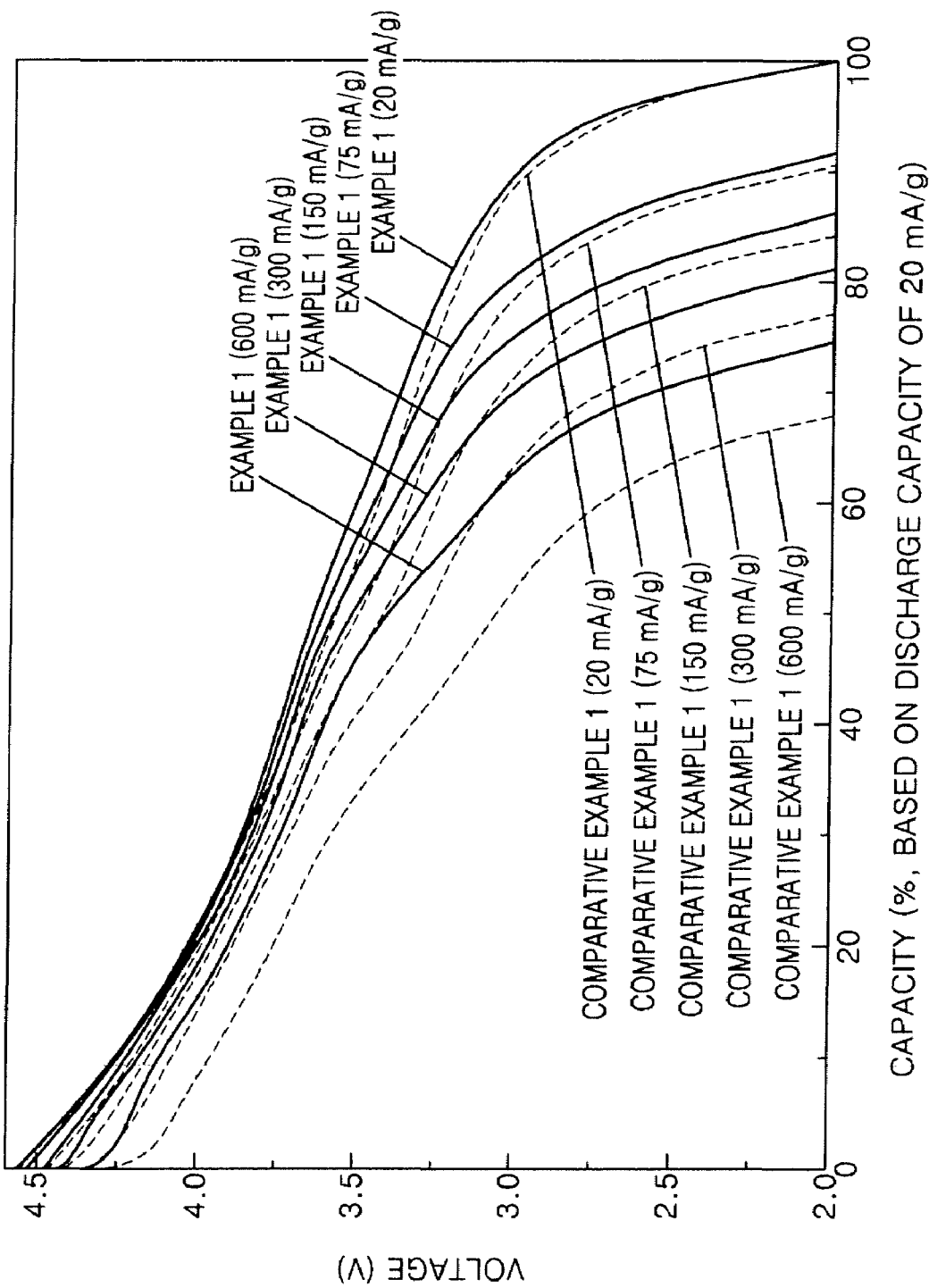
FIG. 5 is a graph comparing the rate capabilities of lithium batteries employing cathode active materials prepared according to Example 1 and Comparative Example 1.

FIG. 5 is a graph illustrating the rate capabilities of lithium batteries employing the cathode active materials prepared according to Example 1 and Comparative Example 1. In FIG. 5, constant-current discharge capacities of 75 mA/g, 150 mA/g, 300 mA/g, and 600 mA/g are expressed as percentages based on the constant-current discharge capacity of 20 mA/g.

Referring to FIG. 5, the lithium batteries employing the cathode active materials prepared according to Example 1 according to an embodiment of the present invention showed better high-rate capabilities than the lithium batteries employing the cathode active materials prepared according to Comparative Example 1. This shows that a battery employing a cathode active material according to an embodiment of the present invention can stably be used in information and communication equipment requiring high-capacity currents.

Cathode active materials according to the present invention are prepared by incorporating transition metals having various oxidation numbers into a $Li_2MeO_3/LiMe'O_2$ complex material. Thus, the volumetric energy density of the electrodes can be increased and the high-rate capabilities of batteries can be enhanced. Cathode active materials having such physical and electrochemical properties can be used to produce high-capacity and small-sized information and communication equipment.

While the present invention has been illustrated and described with reference to certain exemplary embodiments, it is understood by those of ordinary skill in the art that various changes and modifications may be made to the described embodiments without departing from the spirit and scope of the present invention, as defined in the following claims.

What is claimed is:

1. A cathode active material for a lithium battery, the cathode active material comprising a lithium complex represented by Formula 1:

$$yLi[Li_{1/3}Me_{2/3}]O_2\text{-}(1\text{-}y)LiMe'O_2 \qquad \text{Formula 1}$$

wherein:
  $0 < y \leq 0.8$;
  Me is a metal group having a +4 oxidation number and comprises a transition metal selected from the group consisting of Mo, W, V, Ti, Zr, Ru, Rh, Pd, Os, Ir, Pt and combinations thereof; and
  Me' comprises a transition metal selected from the group consisting of Ni, Mn, Co and combinations thereof.

2. The cathode active material of claim 1, wherein Me comprises a material represented by Formula 2:

$$M'_aM_bMn_c \qquad \text{Formula 2}$$

wherein:
  M is a transition metal selected from the group consisting of Mo, W, V, Ti, Zr, Ru, Rh, Pd, Os, Ir, Pt and combinations thereof;
  M' is a metal selected from the group consisting of Ni, Cu, Zn, Co, Cr, Fe, Mg and combinations thereof;
  $0 \leq a \leq 0.33$;
  $0 < b \leq 0.33$; and
  $a+b+c=1$.

3. The cathode active material of claim 2, wherein M is selected from the group consisting of Mo, W, and V.

4. The cathode active material of claim 2, wherein M is Mo and M' is Ni.

5. The cathode active material of claim 4, wherein Mo is present in an amount ranging from about 0.3 to about 10 mole % based on a total number of moles of metals contained in Me and Me'.

6. The cathode active material of claim 1, wherein Me' comprises a material represented by Formula 3:

$$Ni_{a'}Co_{b'}Mn_{c'} \quad \text{Formula 3}$$

wherein $0 \leq a' \leq 0.5$, $0 \leq b' \leq 0.5$ and $a'+b'+c'=1$.

7. The cathode active material of claim 1, wherein $0.4 \leq y < 0.7$.

8. A cathode comprising the cathode active material of claim 1.

9. The cathode of claim 8, wherein Me comprises a material represented by Formula 2:

$$M'_a M_b Mn_c \quad \text{Formula 2}$$

wherein:
M is a transition metal selected from the group consisting of Mo, W, V, Ti, Zr, Ru, Rh, Pd, Os, Ir, Pt and combinations thereof;
M' is a metal selected from the group consisting of Ni, Cu, Zn, Co, Cr, Fe, Mg and combinations thereof;
$0 \leq a \leq 0.33$;
$0 < b \leq 0.33$; and
$a+b+c=1$.

10. The cathode of claim 9, wherein M is selected from the group consisting of Mo, W, and V.

11. The cathode of claim 9, wherein M is Mo and M' is Ni.

12. The cathode of claim 11, wherein Mo is present in an amount ranging from about 0.3 to about 10 mole % based on a total number of moles of metals contained in Me and Me'.

13. The cathode of claim 8, wherein Me' comprises a material represented by Formula 3:

$$Ni_{a'}Co_{b'}Mn_{c'} \quad \text{Formula 3}$$

wherein $0 \leq a' \leq 0.5$, $0 \leq b' \leq 0.5$ and $a'+b'+c'=1$.

14. A lithium battery comprising:
a cathode comprising the cathode active material of claim 1;
an anode; and
an organic electrolyte solution.

15. The lithium battery of claim 14, wherein Me comprises a material represented by Formula 2:

$$M'_a M_b Mn_c \quad \text{Formula 2}$$

wherein:
M is a transition metal selected from the group consisting of Mo, W, V, Ti, Zr, Ru, Rh, Pd, Os, Ir, Pt and combinations thereof;
M' is a metal selected from the group consisting of Ni, Cu, Zn, Co, Cr, Fe, Mg and combinations thereof;
$0 \leq a \leq 0.33$;
$0 < b \leq 0.33$; and
$a+b+c=1$.

16. The lithium battery of claim 15, wherein M is selected from the group consisting of Mo, W, and V.

17. The lithium battery of claim 15, wherein M is Mo and M' is Ni.

18. The lithium battery of claim 17, wherein Mo is present in an amount ranging from about 0.3 to about 10 mole % based on a total number of moles of metals contained in Me and Me'.

19. The lithium battery of claim 14, wherein Me' comprises a material represented by Formula 3:

$$Ni_{a'}Co_{b'}Mn_{c'} \quad \text{Formula 3}$$

wherein $0 \leq a' \leq 0.5$, $0 \leq b' \leq 0.5$ and $a'+b'+c'=1$.

* * * * *